United States Patent
Sugaya

(10) Patent No.: US 7,945,078 B2
(45) Date of Patent: May 17, 2011

(54) USER ACCESSIBLE TISSUE SAMPLE IMAGE DATABASE SYSTEM AND METHOD

(75) Inventor: Kiminobu Sugaya, Winter Park, FL (US)

(73) Assignee: University of Central Florida Research Institute, Inc., Orlando, FL (US)

( * ) Notice: Subject to any disclaimer, the term of this patent is extended or adjusted under 35 U.S.C. 154(b) by 1037 days.

(21) Appl. No.: 11/747,941

(22) Filed: May 14, 2007

(65) Prior Publication Data

US 2008/0288450 A1    Nov. 20, 2008

(51) Int. Cl.
*G06K 9/00*    (2006.01)

(52) U.S. Cl. ........ 382/128; 382/129; 382/130; 382/131; 345/426; 345/440; 702/20

(58) Field of Classification Search .......... 382/128–130, 382/154; 702/20; 707/1, 3, 4; 345/426, 345/440, 460
See application file for complete search history.

(56) References Cited

U.S. PATENT DOCUMENTS

| | | | | |
|---|---|---|---|---|
| 5,737,539 A | * | 4/1998 | Edelson et al. | 705/3 |
| 5,845,255 A | * | 12/1998 | Mayaud | 705/3 |
| 7,072,840 B1 | * | 7/2006 | Mayaud | 705/2 |
| 7,426,475 B1 | * | 9/2008 | Tangellapally et al. | 705/3 |
| 7,825,929 B2 | * | 11/2010 | Kincaid | 345/440 |
| 2006/0020398 A1 | * | 1/2006 | Vernon et al. | 702/20 |

OTHER PUBLICATIONS

Image Compression via Joint Statistical Characterization in the wavelet domain; Buccigrossi et al; Dec. 1999.*
Distributed Web based microstructure database for brain tissue; Wonkyull Koh; May 2000.*
Imaging and the human brain project: A review *; Brinkley et al; Methods Inf Med 2002.*

* cited by examiner

*Primary Examiner* — Vikkram Bali
*Assistant Examiner* — Nancy Bitar
(74) *Attorney, Agent, or Firm* — Timothy H. Van Dyke; Beusse Wolter Sanks Mora & Maire

(57) ABSTRACT

Disclosed herein is a user-accessible tissue image database system. The system is searchable using a query image provided by a user. The query image is matched with images in the database based on common visual features. Specifically exemplified is the matching of images based on the presence of a target molecule and/or internal anatomical structure.

18 Claims, 4 Drawing Sheets

USER ACCESSIBLE TISSUE SAMPLE IMAGE DATABASE SYSTEM AND METHOD

BACKGROUND

Bioinformatics has played a critical role in fueling the revolution in genomics that has occurred over the past decade. It is inconceivable to think how that field would have progressed without the infrastructure to store, analyze and search through the massive quantity of genomic mapping and sequencing data produced. Unlike the one dimensional text data that is at the heart of genomic information, the gene expression maps produced by histological data are two and/or three dimensional datasets. The existing digital atlases have very limited functional and graphical capabilities. Great strides have been made in producing image databases that allow for powerful evaluation and manipulation of 2-D and 3-D images. See, e.g., INTERACTIVE MULTIPLE GENE EXPRESSION MAP SYSTEM (Sugaya et al.) Serial No. PCT/US06/00983. Continued development of systems for evaluating image database might be of great benefit toward collaborative research of the brain, central nervous system, and other organ systems.

DETAILED DESCRIPTION

Figure 1:
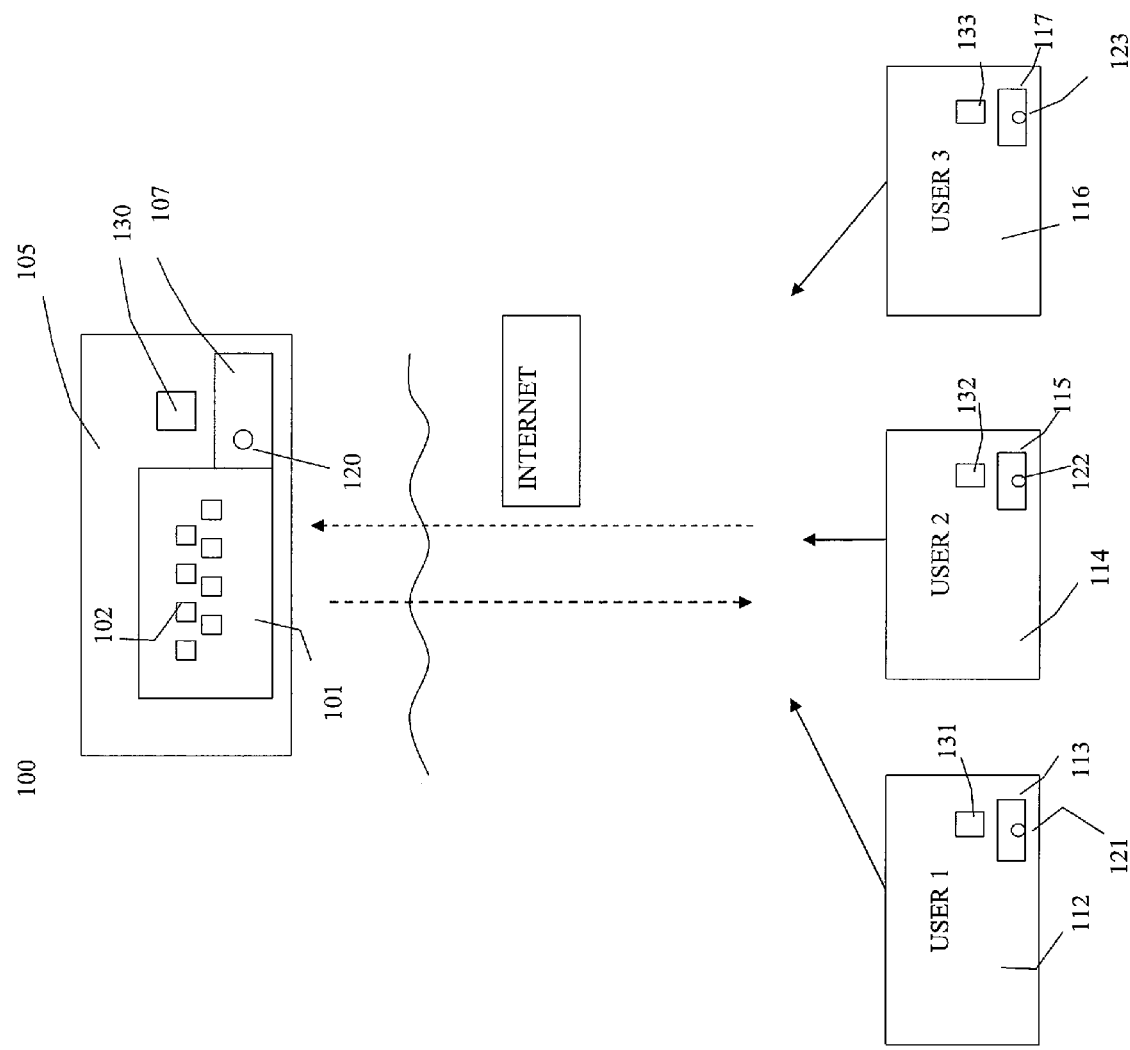
FIG. 1 shows a diagram of a User Accessible Tissue Sample Image system embodiment.

In one embodiment, as shown in FIG. 1, the subject invention relates to a User Accessible Tissue Sample Inage system embodiment 100 comprising a database computer unit 107. A plurality of images 102 are procured, such as by the method discussed in FIG. 2. In a specific embodiment, the images 102 are stored in a storage medium 101. Users 112, 114, 116 each having user computer units 113, 115, 117 that interface with database computer unit 107 via a network connection 109. Each computer unit comprises at least one processing module 120, 121, 122, and 123, respectively, for processing information. Furthermore, each computer unit is communicatingly connected to a display 130 (optional), 131, 132, and 133. Information about images 102 are stored on database computer 107 which are conveyed to users 112, 114, 116 on user computer units 113, 115, and 117 via network connection, such as according to FIGS. 2-4 as described in further detail below. The system provides the customer the ability to search images in the database for their identity to a query image uploaded into the database system. The system promotes ongoing research and facilitates the exchange of information in varying fields of study.

Systems and methods have been developed to identify faces in images, see, e.g., U.S. Pat. No. 7,027,622. However, to the inventors' knowledge, it has yet been contemplated to develop systems involving the accumulation of images based on target molecule and/or internal anatomical structures and integrate these accumulated images into a controllable and searchable database. The provision of such systems and related methods provide powerful research and informational exchanging tools to further medical and scientific research. For example, by utilizing the systems and methods taught herein, a user will be able to immediately elucidate whether a drug candidate affects a region or certain cells of the brain and from that can predict its efficacy.

As will be appreciated by one of skill in the art, embodiments of the present invention may be embodied as a device or system comprising a processing module, and/or computer program product comprising at least one program code module. Accordingly, the present invention may take the form of an entirely hardware embodiment or an embodiment combining software and hardware aspects. Furthermore, the present invention may include a computer program product on a computer-usable storage medium having computer-usable program code means embodied in the medium. Any suitable computer readable medium may be utilized including hard disks, CD-ROMs, DVDs, optical storage devices, or magnetic storage devices.

The term "processing module" may include a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The processing module may have operationally coupled thereto, or integrated therewith, a memory device. The memory device may be a single memory device or a plurality of memory devices. Such a memory device may be a read-only memory, random access memory, volatile memory, non-volatile memory, static memory, dynamic memory, flash memory, and/or any device that stores digital information. A computer, as used herein, is a device that comprises at least one processing module, and optionally at least one memory device.

The computer-usable or computer-readable medium may be or include, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM), a CD ROM, a DVD (digital video disk), or other electronic storage medium. Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of certain embodiments of the present invention may be written in an object oriented and/or conventional procedural programming languages including, but not limited to, Java, Smalltalk, Perl, Python, Ruby, Lisp, PHP, "C", FORTRAN, or C++. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Certain embodiments of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program code modules. These program code modules may be provided to a processing module of a general purpose computer, special purpose computer, embedded processor or other programmable data processing apparatus to produce a machine, such that the program code modules, which execute via the processing module of the computer or other programmable data processing apparatus, create means for implementing the functions specified in the flowchart and/or block diagram block or blocks.

These computer program code modules may also be stored in a computer-readable memory that can direct a computer or other programmable data processing apparatus to function in a particular manner, such that the program code modules stored in the computer-readable memory produce an article of manufacture.

The computer program code modules may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Figure 2:
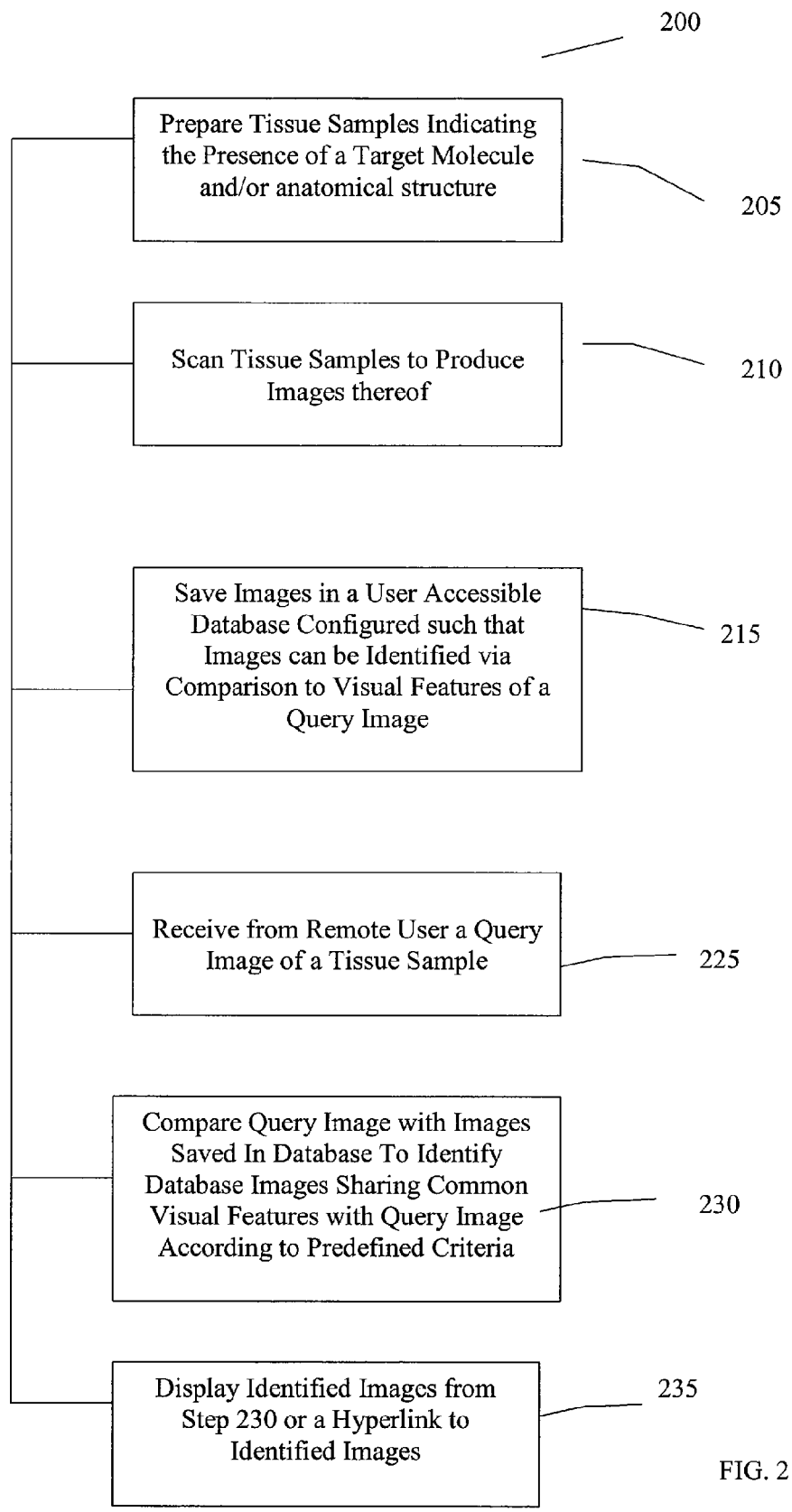
FIG. 2 shows a flow diagram of a method embodiment for evaluating query images for similarities to saved images.

FIG. 2 represents a block diagram of a method embodiment 200. Tissues samples are prepared indicating the presence of a target molecule and/or internal anatomical structure 205. Target molecules may be indicated via the use of in-situ hybridization. For example, molecules designed for binding to a specific target molecule such as polynucleotide sequences, proteins or antibodies are tagged with a marker and are brought in contact with a tissue sample. The binding of the marker/molecules correlates with the presence of the target molecule. Anatomical structures may be indicated via numerous imaging techniques known in the art, including, but not limited to, magnetic resonance imaging and x-ray related techniques such as PET and CAT scans. The tissue samples are scanned to thereby produce images of the samples 210. The images are saved in a user accessible database configured such that images can be identified via a comparison to visual features of a query image 215. The query image is an image uploaded from a user for which images having similar features. A query image of a tissue sample is received from a remote user 225. The query image is compared with images saved in the database to identify database images sharing a common visual feature according to predefined criteria 230. The images identified as sharing a common visual feature are provided to the user 235.

Figure 3:
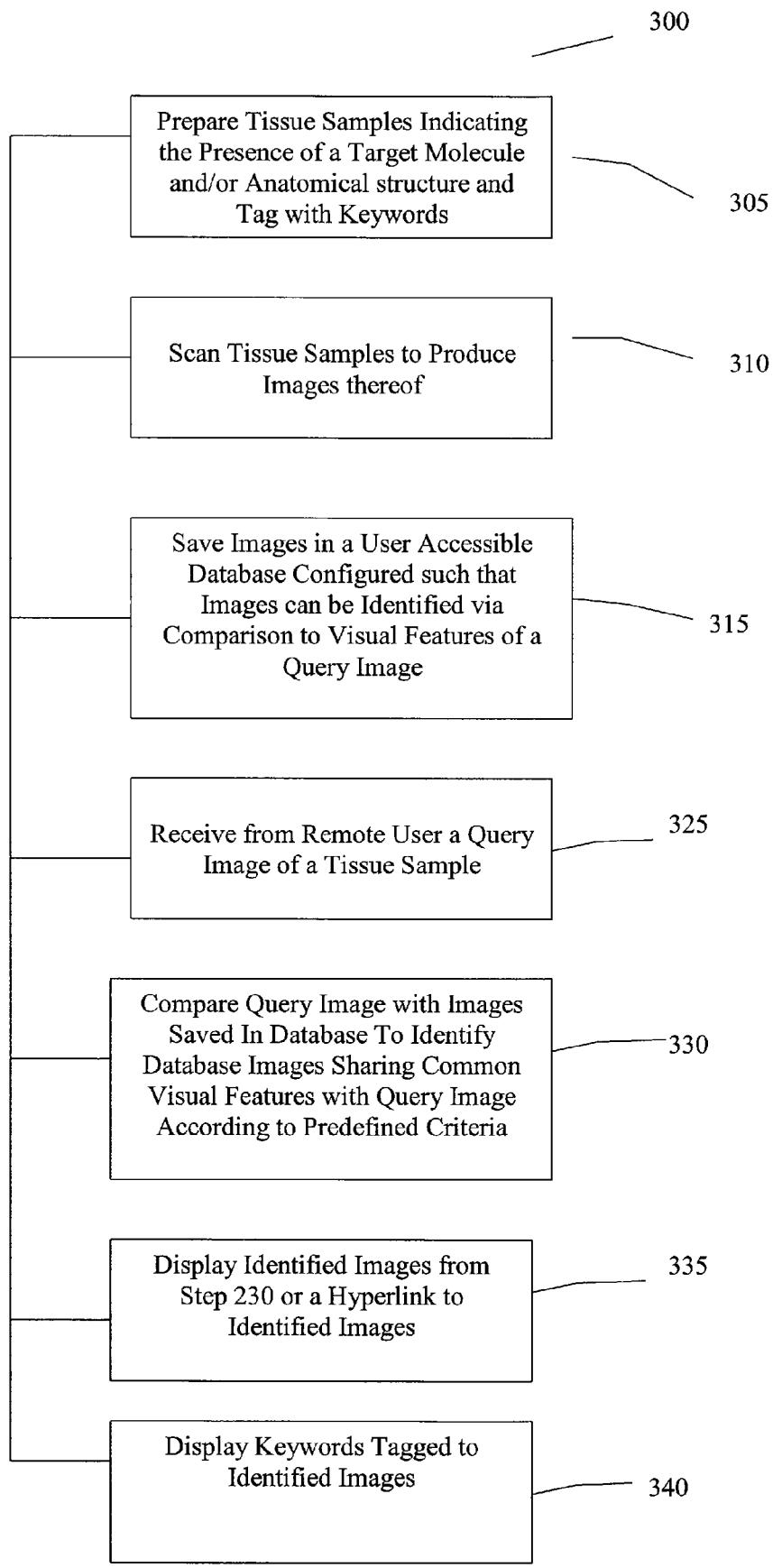
FIG. 3 shows a flow diagram of another method embodiment for evaluating query images for similarities to saved images.

FIG. 3 illustrates a block diagram of another embodiment 300 of the subject invention. Similar to the method in FIG. 2, tissues samples are prepared indicating the presence of a target molecule and/or anatomical structure 305. In addition, keywords are associated (or tagged) with a given image relating to target molecule, tissue-type, animal type, image-type, treatment, etc. The tissue samples are scanned to thereby produce images of the samples 310. The images are saved in a user accessible database configured such that images can be identified via a comparison to visual features of a query image 315. The query image is an image uploaded from a user for which images having similar features. A query image of a tissue sample is received from a remote user 325. The query image is compared with images saved in the database to identify database images sharing a common visual feature according to predefined criteria 330. The images identified as sharing a common visual feature are provided to the user 335. In addition, keywords associated with the identified image are displayed to the user 340.

Figure 4:
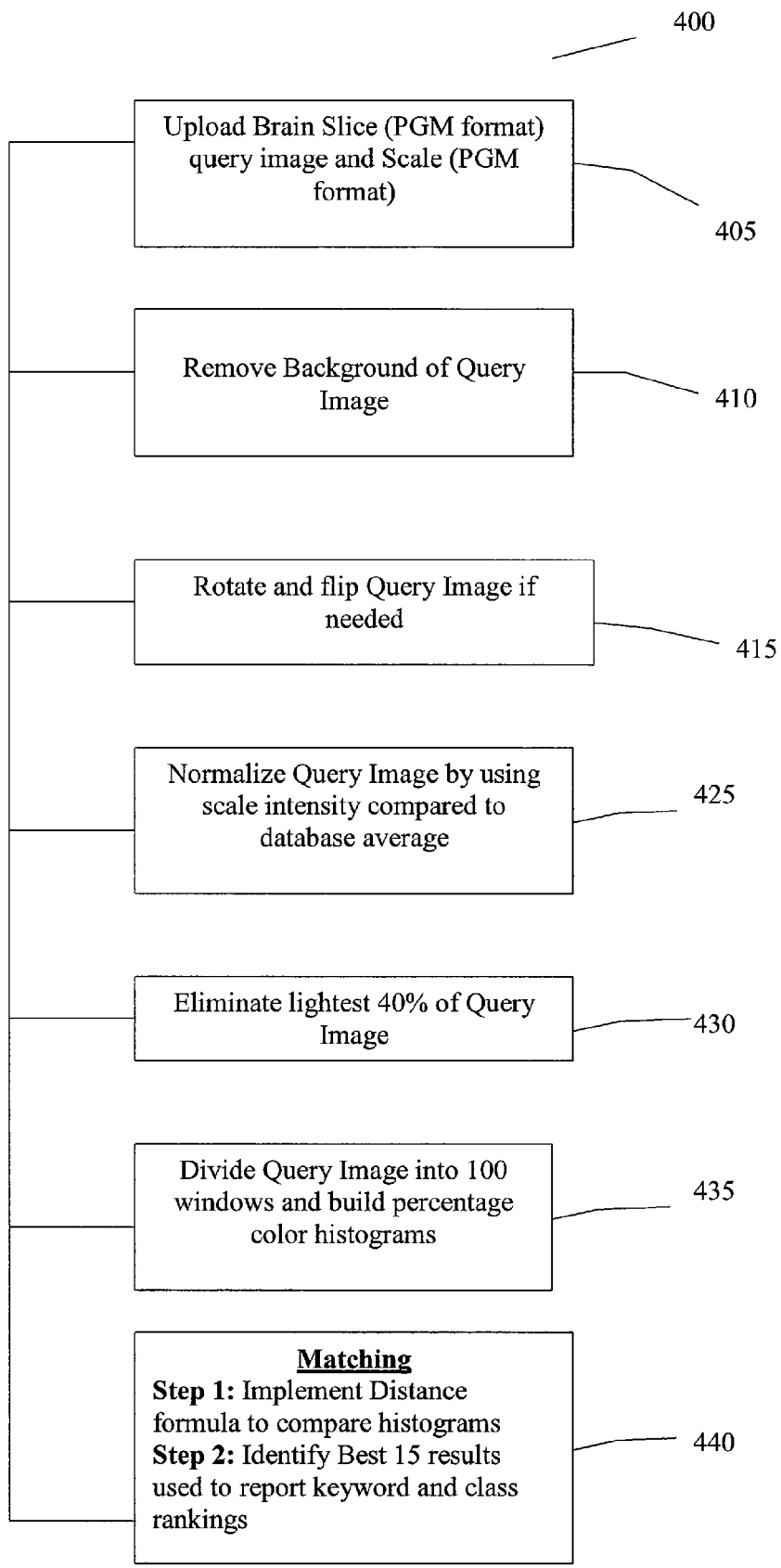
FIG. 4 shows a flow diagram of one embodiment for processing and evaluating images saved in database system.

FIG. 4 illustrates a block diagram representing a specific embodiment 400 of the subject invention. According to this method, a brain slice image and scale is uploaded 405. Step 405 indicates that images are in PGM format. Those skilled in the art will appreciate that the input image may be an image file digitized in one of many possible formats including, for example, a BMP (bitmap) file format, a PGM (Portable Grayscale bitMap graphics) file format, a JPG (Joint Photographic Experts Group) file format, or any other suitable graphic file format. In a digitized image, each pixel is represented as a set of one or more bytes corresponding to a numerical representation (e.g., a floating point number) of the light intensity measured by a camera at the sensing site. The query image may be gray-scale, i.e., measuring light intensity over one range of wavelength, or color, making multiple measurements of light intensity over separate ranges of wavelength. The background of the query image is removed 410. For example, the most common color of the image is determined and 30 to 40 percent around this color is eliminated. This eliminates most of the background. In order to increase efficiency of this process, the image may be shrunk (or reduced) to a fraction of its original size. For example, the image is reduced to 5-50 percent of its original size. In a specific embodiment, the image is reduced to 5, 10, 15, 20, 25, 30, 35, 40, 45, or 50 percent of its original size. The background color is eliminated based on the reduced image. Upon elimination of the most common color, the reduced image is converted back to its original size. The converted image can then be applied over the original image as a mask, which is applied to the original image. The query image is rotated and flipped if needed 415. This is done to achieve an alignment similar to the database images. The query image is normalized by using scale intensity compared to database average 425. The lightest 40% of the query image is eliminated 430. The query image is divided into 100 windows and percentage color histograms are built 435. The query image is compared to images in the database and the best 15 images are provided to the user 440. Matches to database images may be made using a standard matching formulas. For example, U.S. Pat. No. 7,133,555 is cited for teachings of one example of matching means that may be employed. The '555 patent discusses the comparison of intensity levels for red, green and blue, but, in view of the teachings herein, those skilled in the art will appreciate that the techniques taught in the '555 patent may be applied to only one color or gray scale. U.S. Pat. No. 6,763,148 is also cited to for other means of matching images.

U.S. Pat. Nos. 7,194,114; 6,895,107 and 6,611,344 are cited to for background information about image processing techniques. The teachings of all references cited herein are incorporated by reference in their entirety to the extent not inconsistent with the teachings herein.

What is claimed is:

1. A method of querying an image database comprising a plurality of digital images of tissue samples indicating a presence of a target molecule and/or digital images of internal anatomical structures, the method comprising:

uploading a query image with a scale;
removing a portion of background of said query image;
normalizing said query image by comparing scale intensity to an average intensity of said plurality of digital images;
eliminating lightest 20 to 50 percent portion of said query image;
dividing said query image into a plurality of windows;
building percentage color histograms corresponding to said plurality of windows; and matching said query image to images of said plurality of digital images by comparing histograms;
displaying match images from said plurality of digital images.

2. The method of claim 1, wherein said plurality of digital images comprises images of tissue samples treated via in-situ hybridization directed at a target molecule.

3. The method of claim 1, wherein said plurality of digital images comprises images of internal tissue obtained by magnetic resonance imaging.

4. The method of claim 1, wherein said plurality of digital images comprises images of internal tissue obtained by x-ray imaging.

5. The method of claim 1, wherein said query image and scale are in PGM format.

6. The method of claim 1, wherein said removing a portion of background of said query image comprises reducing said query image to 5 to 50 percent of its original size to produce a reduced image; determining a most common color of said reduced image; eliminating region of said reduced image comprising said most common color to produce a processed image; converting said processed image to original size to produce a converted image; and applying said converted image as a mask over said query image.

7. The method of claim 6, wherein said reduced image is reduced to 5-15 percent of its original size.

8. The method of claim 1, wherein matching said query image comprises comparing histograms of said query image with histograms of said plurality of digital images according to gray values.

9. A user accessible tissue image database system comprising
  a computer unit comprising at least one processing module and at least two computer-readable program code modules; and
  a plurality of images stored in said computer unit, wherein said plurality of images are digital images of tissue samples indicating a target molecule;
  wherein said at least two computer-readable program code modules comprises
    a first computer-readable program code module for causing said computer to upload a query image with a scale;
    a second computer-readable program code module for causing said computer to remove a portion of background of said query image;
    a third computer readable program code module for causing said computer to normalize said query image by comparing scale intensity to an average intensity of said plurality of digital images;
    a fourth computer-readable program code module for causing said computer to eliminate lightest 20 to 50 percent portion of said query image;
    a fifth computer-readable program code module for causing said computer to divide said query image into a plurality of windows;
    a sixth computer-readable program code module for causing said computer to build percentage color histograms corresponding to said plurality of windows; and
    a seventh computer-readable program code module for causing said computer to match said query image to images of said plurality of digital images by comparing histograms.

10. The system of claim 9, wherein said at least two program code modules further comprise an eighth computer-readable program code module for causing said computer to display images matched with said query image.

11. The system of claim 10, wherein said plurality of images are tagged with keywords and wherein said keywords are displayed with images matched with said query image.

12. The system of claim 9, wherein said plurality of digital images comprises images of tissue samples treated via in-situ hybridization directed at a target molecule.

13. The system of claim 9, wherein said plurality of digital images comprises images of internal tissue obtained by magnetic resonance imaging.

14. The system of claim 9, wherein said plurality of digital images comprises images of internal tissue obtained by x-ray imaging.

15. The system of claim 9, wherein said query image and scale are in PGM format.

16. The system of claim 9, wherein said computer unit is connected to a computer network.

17. The system of claim 9, wherein said computer network is the internet.

18. The system of claim 9, wherein eighth computer-readable program code module causes said computer to compare histograms of said query image with histograms of said plurality of digital images according to gray values.

* * * * *